United States Patent [19]
Lyon

[11] Patent Number: 6,022,290
[45] Date of Patent: Feb. 8, 2000

[54] POWER TRANSFER SYSTEM FOR VEHICLE WITH POWER-INTERRUPT AUTO-MANUAL TRANSMISSION, ALTERNATE MEANS FOR PROVIDING TORQUE TO DRIVELINE, AND ENGINE THROTTLE CONTROLS

[75] Inventor: Kim Lyon, Bloomfield Hills, Mich.

[73] Assignee: Chrysler Corporation, Auburn Hills, Mich.

[21] Appl. No.: 09/150,550

[22] Filed: Sep. 9, 1998

[51] Int. Cl.$^7$ .............................. B60K 6/04; B60K 41/04
[52] U.S. Cl. .......................... 477/108; 475/207; 74/661; 74/733.1; 180/65.2
[58] Field of Search ..................................... 475/207, 208, 475/218, 219, 329, 330, 151; 74/333, 325, 331, 335, 665 P, 730.1, 732.1, 733.1; 192/3.55, 3.61, 3.62, 3.63; 180/65.2, 65.3, 65.4; 477/2, 3, 5

[56] References Cited

U.S. PATENT DOCUMENTS

| | | |
|---|---|---|
| 3,802,293 | 4/1974 | Winckler et al. ...................... 74/331 X |
| 3,956,947 | 5/1976 | Leising et al. . |
| 4,478,106 | 10/1984 | Schreiner ................................. 475/276 |
| 5,478,293 | 12/1995 | Yonezawa ........................... 477/107 X |
| 5,713,426 | 2/1998 | Buschhaus et al. ................... 74/661 X |

*Primary Examiner*—Charles A Marmor
*Assistant Examiner*—Ankur Parekh
*Attorney, Agent, or Firm*—Mark P. Calcaterra

[57] ABSTRACT

A power transfer system for a vehicle having a power source and a driveline, the power transfer system including a power-interrupt auto-manual transmission, an electronic control unit and electronic throttle controls. In the preferred embodiment, the power transfer system includes an epicyclic gearset for providing a level of drive torque to the driveline during the shifting of the transmission so as to eliminate the undesirable sensations experienced by the vehicle operator during the shifting of the transmission. The electronic throttle controls allow the rotational speed of the engine to be maintained at a desired level while the shift is being performed so as to improve fuel economy and reduce emissions. Alternate embodiments of the present invention utilize a secondary power source powered by a source of stored energy to provide the driveline with drive torque during a shift.

11 Claims, 3 Drawing Sheets

POWER TRANSFER SYSTEM FOR VEHICLE WITH POWER-INTERRUPT AUTO-MANUAL TRANSMISSION, ALTERNATE MEANS FOR PROVIDING TORQUE TO DRIVELINE, AND ENGINE THROTTLE CONTROLS

BACKGROUND OF THE INVENTION

1. Field of the Invention

The present invention relates to a power transfer system for use in a motor vehicle, and more specifically to a power-interrupt auto-manual transmission having means for providing power to the output side of the transmission during the shifting of the transmission.

2. Related Art

Over the past two decades, vehicle manufacturers have made enormous efforts to improve fuel economy and reduce exhaust emissions. The principal commercially acceptable source of these improvements has been in the area of engine combustion technology; improvements in the area of power transfer systems have generally not yielded much commercial success due to the consumer preference for the automatic transmission.

Automatic transmissions incorporating torque converters, epicyclic gear trains and hydraulic pumps represent a high degree of sophistication in response to changing vehicle speed, engine speed and operator commands. As such, automatic transmissions have gained wide acceptance in automobiles and light trucks despite their failure to achieve throughput efficiency as high as an equivalent manual transmission. In operation, this lower efficiency manifests itself as higher fuel consumption by a vehicle equipped with an automatic transmission than a comparable vehicle equipped with a manual transmission. In passenger cars where convenience is a major consideration, a fuel consumption penalty of five to ten percent is generally tolerated.

One prior art solution, known as the power-interrupt auto-manual transmission, has been a power transfer system having a conventional manual transmission coupled with means for shifting the transmission automatically. In operation, the shifting means monitors a number of vehicle dynamics, including vehicle speed and engine speed, and performs a shift in response to these dynamics according to a predetermined algorithm. To perform a shift, the shifting means interrupts the supply of power to the transmission by disengaging a clutch, selects the desired gear stack and then engages the clutch to actuate the new gear stack. The shifting means essentially removes the need for human interaction from the shifting of a manual transmission, allowing shifts to be performed under optimal conditions. As such, improved fuel economy is provided even when compared against a completely manual transmission. Power-interrupt auto-manual transmissions also have the advantage of being generally less complex and less costly than a comparable automatic transmission or other auto-manual transmission types, such as the preselector type.

However, in spite of these advantages, power-interrupt auto-manual transmissions have not met with widespread commercial success as a result of the transmission shift characteristics. These characteristics include a number of subjective and objective criteria, but most significantly include the sensation of "no power" experienced by the vehicle operator during a shift and the overall cycle time of the shift.

The sensation of "no power" is created when the shifting means interrupts the supply of drive torque to the transmission during a shift and as such, the potential for this sensation is not unique to power-interrupt auto-manual transmissions. However, operators of vehicles equipped with manual transmissions are distracted by the manual operation of the clutch and gear selector and consequently do not develop the sensation of "no power." Although the shifting cycle of an automatic transmission or a preselector auto-manual transmission is comparable with that of a power-interrupt auto-manual transmission, the automatic and preselector transmissions are able to engage two gearsets during at least a portion of the shifting cycle which thereby eliminates the sensation of "no power" experienced by the vehicle operator. Although advancements in logic controls and electro-mechanical actuators offer some promise of reducing the overall cycle time of the shift of a power-interrupt auto-manual transmission, it is unlikely that the cycle time could be shortened enough to eliminate the sensations of "no power" due to the fundamental differences in the gear shifting mechanics between automatic and power-interrupt auto-manual transmissions.

Another matter impeding the commercial acceptance of power-interrupt auto-manual transmissions concerns the fueling of the vehicle engine during a shift. During the power-interrupt portion of the shift, the throttle controls of the prior art power-interrupt auto-manual transmissions typically reduce the fuel supplied to the engine, causing the engine to decelerate during the shift. The engine is therefore decelerated at the beginning of the shifting cycle when power to the transmission is interrupted and accelerated at the end of the shifting cycle to match the engine speed to the speed of the transmission. As such, the exhaust emissions output of the vehicle is negatively impacted as a result of the deceleration and acceleration that accompanies every shift.

Consequently, there remains a need in the art for a power-interrupt auto-manual transmission that substantially eliminates the sensation of "no power" experienced by the vehicle operator during a shift. There also remains a need in the art for a power-interrupt auto-manual transmission with improved throttle controls to reduce exhaust emissions of the engine produced during the shifting cycle.

BRIEF SUMMARY OF THE INVENTION

It is therefore an object of the present invention to provide a power transfer system for a vehicle having a power-interrupt auto-manual transmission wherein torque is provided to the output side of the transmission during at least a portion of the shifting cycle to substantially eliminate the sensation of "no power" experienced by the vehicle operator.

It is another object of the present invention to provide a power transfer system for a vehicle having a power-interrupt auto-manual transmission having improved throttle controls to reduce exhaust emissions produced by the engine during the shifting cycle.

The preferred embodiment of the present invention incorporates a planetary gear assembly into a conventional power-interrupt auto-manual transmission to divert a portion of the drive torque from the input side of the transmission to the output side of the transmission during a segment of the shifting cycle. Electronic throttle controls are used to regulate engine speed during the shifting cycle so as to eliminate the need for fuel interrupt schemes and to maintain a constant engine speed.

Several alternate embodiments are also disclosed wherein a secondary power source, such as a battery-operated motor, are operably connected to the output side of the transmission to provide drive torque to the driveline during a segment of the shifting cycle.

DETAILED DESCRIPTION OF THE DRAWINGS

Figure 1:
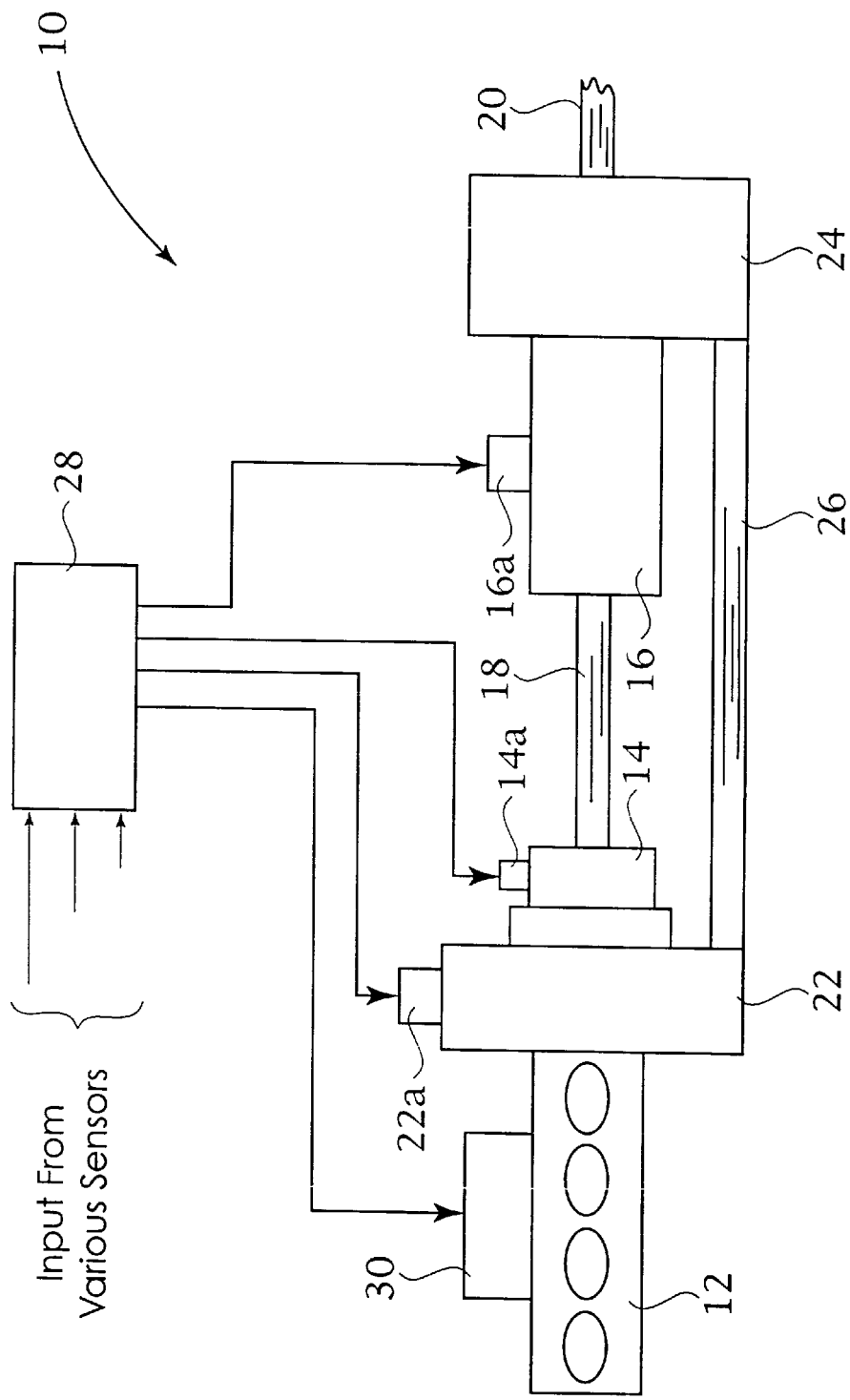
FIG. 1 is a schematic illustration of an engine coupled to a power transfer system according to the preferred embodiment of the present invention.

With reference to FIG. 1 of the drawings, a power transfer system for a vehicle having a power source and a driveline is shown. Power transfer system 10 is shown operably connected to a power source, such as engine 12 and includes a clutch 14, a power-interrupt auto-manual transmission 16 having a plurality of gearsets for establishing various speed ratios, an input shaft 18 for transmitting drive torque from engine 12 to auto-manual transmission 16, and an output shaft 20 for providing drive torque to a driveline (not shown). According to the preferred embodiment of the present invention, power transfer system 10 also includes first and second epicyclic gearsets 22 & 24, an epicyclic gearset shaft 26, an electronic control unit (ECU) 28 and electronic throttle controls 30.

First and second epicyclic gearsets 22 & 24 are operable for transmitting a second level of drive torque to the driveline during at least a portion of the time at which auto-manual transmission 16 is being shifted between gearsets. First epicyclic gearset 22 is operably connected to engine 12 so as to receive a drive torque input. Torque is transmitted from first epicyclic gearset 22 to second epicyclic gearset 24 by epicyclic gearset shaft 26. Second epicyclic gearset 24 is operably connected to the driveline so as to provide a second level of drive torque of sufficient magnitude to eliminate the sensation of "no power" that would otherwise be experienced by the vehicle operator when auto-manual transmission 16 is shifted between gearsets. Preferably, this second level of drive torque is sufficient to maintain the speed of the vehicle. It is not necessary, however, that a level of drive torque sufficient to accelerate the vehicle be transmitted through the epicyclic gearsets.

ECU 28 is electrically connected to various sensors located throughout the vehicle so as to monitor the current state of vehicle dynamics including vehicle speed, engine speed, throttle position, active auto-manual transmission gearset, etc. ECU 28 is also electrically connected to an electronic clutch actuator 14a operable for causing clutch 14 to engage and disengage, an electronic gearshift actuator 16a operable for causing the selective engagement of an auto-manual transmission gearset, an epicyclic gearset actuator 22a operable for selectively causing drive torque to be transmitted through the first and second epicyclic gearsets 22 & 24 and the electronic throttle control 30 for operably controlling the amount of air, and thereby the air-to-fuel ratio, being delivered to the engine 12 for combustion.

Operation of a vehicle equipped with the power transfer system of the present invention will require shifting between the various gearsets of auto-manual transmission 16 from time to time. Shifting between gearsets of the auto-manual transmission is performed in response to changes in the conventional vehicle and engine dynamics (e.g., changes in vehicle or engine speed, the detection of rapid acceleration). When a shift is required, ECU 28 causes clutch actuator 14a to disengage the clutch 14 to interrupt the flow of drive torque from the engine 12 into the auto-manual transmission 16. ECU 28 next causes auto-manual transmission actuator 16a to engage a next gearset after which the clutch actuator 14a is caused to engage the clutch and allow the flow of drive torque into the auto-manual transmission 16 to resume.

During the shifting operation, it is desirable to maintain the rotational speed of the engine 12 at a constant level which ranges between the rotational speed of the engine just prior to the disengagement of clutch 14 and the anticipated rotational speed of input shaft 18 just after the engagement of clutch 14. The operation of the engine at a speed within these ranges eliminates much of the inefficiency that is associated with the deceleration and acceleration of the engine, thereby improving both fuel economy and emissions. As such, ECU 28 operably controls electronic throttle control 30 to modulate the amount of fuel and air being delivered to engine 12 so as to maintain rotational speed within this range. Generally, the level of fuel and air being supplied to engine 12 for combustion is reduced during a shift since a rapid drop in the load on engine 12, as would be caused through the disengagement of a clutch 14, would typically cause an increase in the rotational speed of the engine 12. In order to prevent the vehicle operator from inadvertently impairing fuel economy, the position of the accelerator pedal (not shown) is not used to regulate the amount of fuel and air delivered to the engine for combustion throughout the shift (i.e., the delivery of air and fuel to the engine 12 for combustion is controlled independently of the position of the accelerator pedal during the shift). The position of the accelerator pedal may be maintained in its pre-shift position (i.e., the position it was in just prior to the commencement of the shift) although this is not required. Subsequent to the engagement of the new gearset, ECU 28 causes the electronic throttle control 30 to alter the speed of the engine so as to match the speed of the input shaft 18 within a predefined range prior to the engaging of clutch 14. After clutch 14 has been fully disengaged, ECU 28 returns the control of the accelerator pedal to the vehicle operator.

In the preferred embodiment, ECU 28 actuates epicyclic gearset actuator 22a so as to cause drive torque to be transmitted through the epicyclic gearsets during at least a portion of the time period associated with the performing of a shift (i.e., a time period commencing with the disengagement of the clutch and ending with the engaging of the clutch). As mentioned above, the magnitude of the torque transmitted through the epicyclic gearsets does not have to be sufficient to cause the vehicle to accelerate; rather, all that need be transmitted is an amount sufficient to eliminate the sensation of "no-power" experienced by the vehicle operator during the shift. Preferably, this amount is also sufficient to maintain the velocity of the vehicle during the shift. The transmission of torque through the epicyclic gearsets is then terminated at a point in time either before the clutch 14 is engaged or simultaneously with its engagement.

Figure 2:
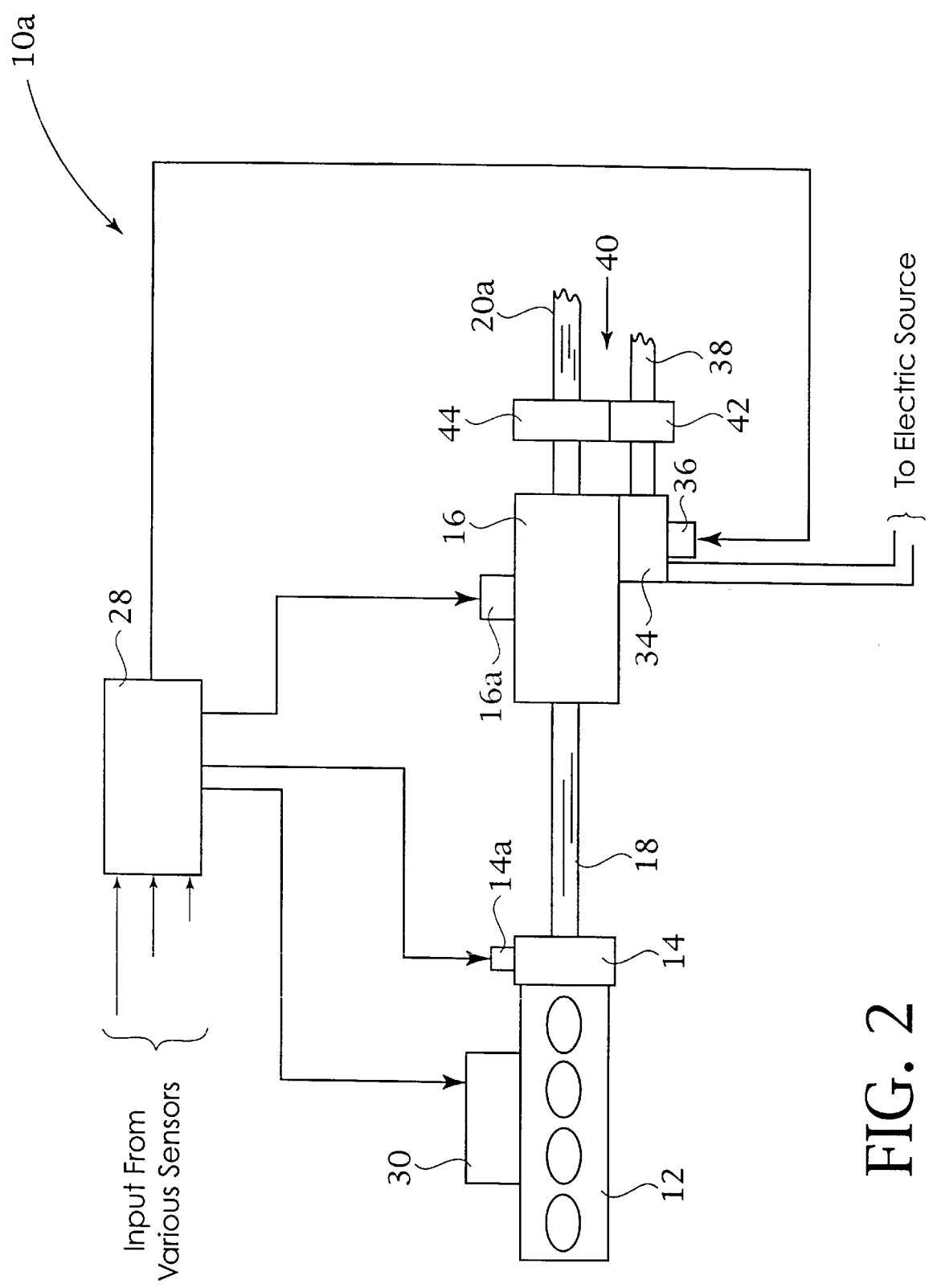
FIG. 2 is a schematic illustration of an engine coupled to a power transfer system according to an alternate embodiment of the present invention.
Figure 3:
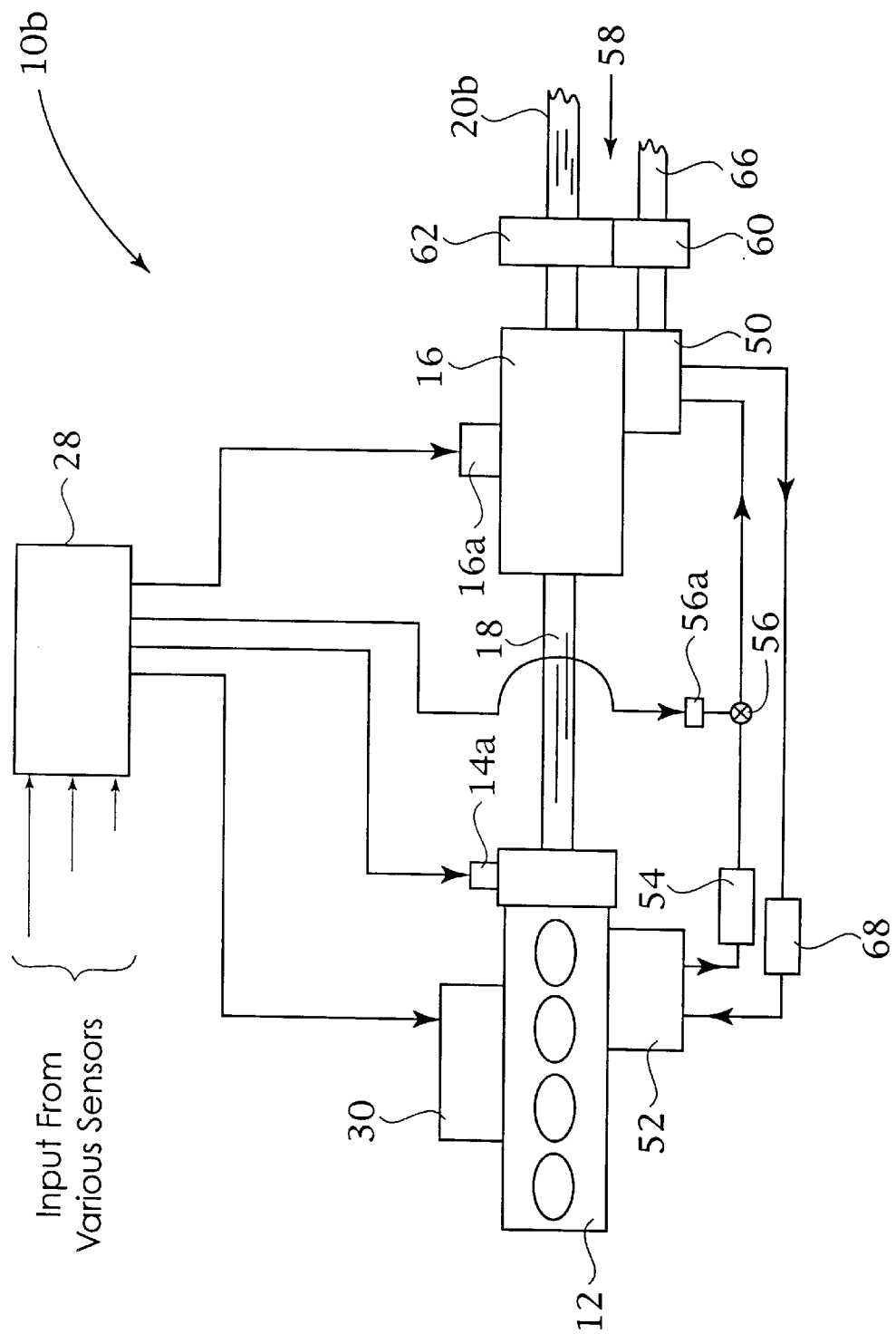
FIG. 3 is a schematic illustration of an engine coupled to a power transfer system according to a second alternate embodiment of the present invention.

FIGS. 2 and 3 are schematic illustrations of alternate embodiments of the present invention. Due to the similarity of the power transfer systems of the alternate embodiments to that of the above-described power transfer system 10, the same reference numerals are used to identify common or substantially similar components. FIG. 2 shows an alternate embodiment of the present invention wherein power transfer system 10*a* includes an electric motor 34 which is powered by an electric source, such as batteries, ultracapacitors or a flywheel/generator (not shown), and operably connected to output shaft 20*a* through a gearset so as to provide a second level of drive torque to the driveline during at least a portion of the shift. ECU 28 is electrically connected to motor actuator 36 and is operable for controlling the operation of electric motor 34. Gearset 40 is comprised of a first gear 42 which is fixed for rotation with motor output shaft 38 and a second gear 44 which is fixed for rotation with output shaft 20*a* and meshingly engaged with first gear 42. During at least a portion of the shift, ECU 28 causes electric motor 34 to operate, drawing power from the electric source. Torque generated by electric motor 34 is output through motor output shaft 38, driving first gear 42 which in turn causes second gear 44 to provide output shaft 20*a* with a second level of drive torque. With respect to this embodiment, it is preferred that electric motor 34 also have the capability to generate electricity so as to charge the electric source during the routine operation of the vehicle.

FIG. 3 shows a second alternate embodiment of the present invention wherein power transfer system 10*b* includes a hydraulic motor 50 which is powered by stored fluid pressure and operably connected to output shaft 20*b* through a gearset so as to provide a second level of drive torque to the driveline during at least a portion of the shift. Hydraulic fluid is drawn from a reservoir 68 by hydraulic pump 52 and pressurized. Pressurized hydraulic fluid exits hydraulic pump 52 and is stored in accumulator 54 where its release is controlled by ECU 28. ECU 28 is electrically connected to valve actuator 56*a* which is operable for opening and closing valve 56 in response to signals generated by ECU 28. When a second level of drive torque is needed, ECU 28 causes valve actuator 56*a* to open valve 56 and release fluid from accumulator 54, causing motor 50 to rotate. Gearset 58 is comprised of first gear 60 which is fixed for rotation with motor output shaft 66 and second gear 62 which is fixed for rotation with output shaft 20*b* and meshingly engaged with first gear 60. Torque generated by the operation of hydraulic motor 50 is output through motor output shaft 66, driving first gear 60 which in turn causes the second gear 62 to provide output shaft 20*b* with a second level of drive torque.

The foregoing discussion discloses and describes various embodiment of the present invention. One skilled in the art will readily recognize from such discussion, and from the accompanying drawings and claims, that various changes, modifications and variations can be make therein without departing from the true spirit and fair scope of the invention as defined in the following claims.

I claim:

1. A power transfer system for a vehicle having a power source providing a source of input torque and a driveline, said power transfer system comprising:

a power-interrupt auto-manual transmission adapted for connection with said power source and said driveline to provide said driveline with a first level of drive torque, said power-interrupt auto-manual transmission including a plurality of gear ratios for controlling a speed of said vehicle and means for interrupting the distribution of said first level of drive torque to said driveline during a shift between said gear ratios;

means for providing a second level of drive torque to said driveline operable during at least a portion of said shift; and engine throttle controls for controlling a delivery of air to said power source during at least a portion of said shift wherein said engine throttle controls are for controlling a rotational speed of said power source during said at least a portion of said shift to maintain said rotational speed of said power source at a speed substantially equal to the rotational speed of said power source just prior to said shift.

2. A power transfer system for a vehicle having a power source providing a source of input torque and a driveline, said power transfer system comprising:

a power-interrupt auto-manual transmission adapted for connection with said power source and said driveline to provide said driveline with a first level of drive torque, said power-interrupt auto-manual transmission including a plurality of gear ratios for controlling a speed of said vehicle and means for interrupting the distribution of said first level of drive torque to said driveline during a shift between said gear ratios;

means for providing a second level of drive torque to said driveline operable during at least a portion of said shift; and wherein said means for providing a second level of drive torque to said driveline is an apparatus adapted to divert at least a portion of said input torque from said power source to said driveline during said at least a portion of said shift.

3. The power transfer system of claim 2 wherein said apparatus is an epicyclical gearset having a first epicyclical gearset portion, a second epicyclical gearset portion and a shaft portion, said first epicyclical gearset portion adapted for connection to said power source, said second epicyclical gearset portion adapted for connection to said driveline, said shaft portion coupling said first and second epicyclical gearset portions to permit drive torque to be transmitted therebetween.

4. The power transfer system of claim 1 wherein said means for providing a second level of drive torque to said driveline includes an apparatus having a source of stored energy, said apparatus operably connected to said driveline and releasing said stored energy to create said second level of drive torque.

5. The power transfer system of claim 4 wherein said apparatus includes an electric motor and said source of stored energy is a flywheel generator.

6. The power transfer system of claim 4 wherein said apparatus includes an electric motor and said source of stored energy is an ultra-capacitor.

7. The power transfer system of claim 4 wherein said apparatus includes an electric motor and said source of stored energy is an electric battery.

8. The power transfer system of claim 4 wherein said apparatus includes a hydraulic motor and said source of stored energy is a device which accumulates pressurized hydraulic fluid.

9. A power transfer system for a vehicle having a power source providing a source of input torque and a driveline, said power transfer system comprising:

a power-interrupt auto-manual transmission adapted for connection with said power source and said driveline to provide said driveline with a first level of drive torque, said power-interrupt auto-manual transmission including a plurality of gear ratios for controlling a speed of said vehicle and means for interrupting the distribution of said first level of drive torque to said driveline during a shift between said gear ratios; and an epicyclical gearset adapted for connection with said power source and said driveline for diverting at least a portion of said input torque from said power source to said driveline so as to provide a second level of drive torque to said driveline during at least a portion of said shift.

10. The power transfer system of claim 9 further comprising engine throttle controls adapted for controlling a delivery of air to said power source during at least a portion of said shift.

11. The power transfer system of claim 10 wherein said engine throttle controls are adapted for controlling a rotational speed of said power source during at least a portion of said shift.

* * * * *